Jan. 29, 1935.  C. G. SUITS  1,989,501
CONTROL SYSTEM
Filed March 18, 1933

Inventor:
Chauncey G. Suits,
by Charles E. Mullan
His Attorney.

Patented Jan. 29, 1935

1,989,501

UNITED STATES PATENT OFFICE 1,989,501

CONTROL SYSTEM

Chauncey G. Suits, Schenectady, N. Y., assignor to General Electric Company, a corporation of New York Application March 18, 1933, Serial No. 661,532

4 Claims. (Cl. 175—312)

This invention relates to control systems, more particularly to illumination control systems, and it has for an object the provision of a simple, reliable, inexpensive and improved system of this character.

In carrying the invention into effect in one form thereof, a load circuit is controlled by means of a series connected variable reactance device provided with a magnetization control winding, and direct current of variable magnitude is supplied to this control winding by means of a suitable rectifying device, the input to which is controlled by a second variable reactance device which in turn is under the control of a suitable control device.

In illustrating the invention in one form thereof, it is shown as embodied in a theatre illumination control system.

Figure 1:
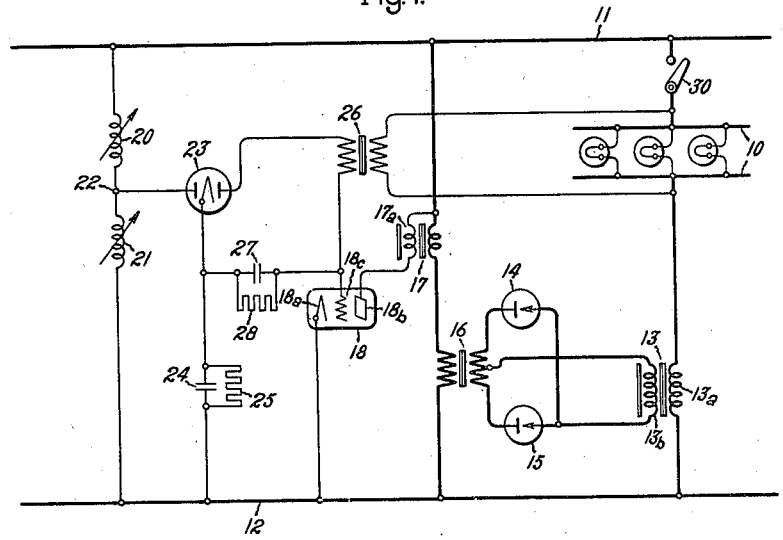
Figure 2:
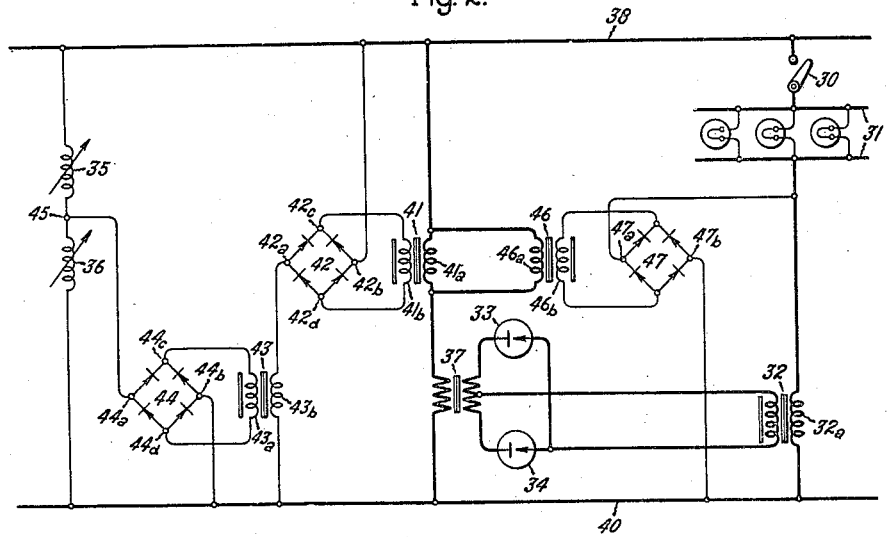

For a better and more complete understanding of the invention, reference should now be had to the following specification and to the accompanying drawing in which Fig. 1 is a simple diagrammatical representation of an embodiment of the invention and Fig. 2 is a simple diagrammatical representation of a modification.

Referring now to the drawing, a load circuit 10, illustrated as a plurality of electric lamps, is supplied from a suitable source of alternating current, such for example, that represented in the drawing by the upper end lower supply lines 11 and 12. For the purpose of varying the voltage applied to the lamps and consequently the intensity of illumination thereof, means illustrated as a variable impedance device 13 are provided. This variable impedance device is of the direct current saturable core type, having its alternating current winding 13a connected in series relationship between one side of the load 10 and the lower supply line 12 and having a direct current variable magnetization control winding 13b. The reactance of this device depends upon the degree to which the core is saturated by the direct current flowing in the direct current control winding and since the reactance is thus variable, it will be seen that the reactive voltage drop across the winding 13a is likewise variable in accordance with the degree of saturation. A variation in the reactance of the alternating current winding 13a effects a variation in the voltage drop across the load circuit 10 and thus it will be seen that by varying the current flowing in the control winding 13b the intensity of illumination of the lamps of the load circuit is likewise varied.

Direct current is supplied to the control winding 13b by any suitable rectifying means illustrated as a pair of two element electric valves 14 and 15 connected for full wave rectification. The utilization of electric valves is purely optional and it is pointed out that instead of the valves 14 and 15 any other suitable rectifying device such, for example, as a surface contact rectifying device in the form of a copper oxide bridge may be employed. As shown, the anodes of the valves 14 and 15 are respectively connected to opposite terminals of the secondary winding of a transformer 16, one terminal of the primary winding of which transformer is connected to the lower supply line 12 and the opposite terminal of which primary winding is connected to the upper supply line 11 in series relationship with the reactive winding of a saturable core type variable reactance device 17. The reactance device 17 is provided with a direct current magnetization control winding 17a to which direct current of variable magnitude is supplied by means of a suitable rectifying device illustrated as a three element electric valve 18. The valve 18 is preferably of the "hard" or "high vacuum type" and as illustrated its three elements comprise a cathode 18a, an anode 18b and a control grid 18c. The cathode 18a is connected to the lower supply line 12 while the anode 18b is connected to the upper supply line 11 through the direct current control winding 17a of the reactance device. Valve 18 thus supplies half wave rectified current to the control winding of the reactance.

In order to vary the current flowing in the control winding, the control grid 18c of the valve is connected to a source of variable voltage. This source of variable voltage is illustrated as a variable voltage drop device comprising a pair of solenoids 20 and 21 having their reactive winding connected in series relationship with each other across the supply lines 11—12. These solenoids 20 and 21 are each provided with a movable core member (not shown) and these core members in turn are so connected to a movable manually operable control handle that movement of the handle in one direction moves one core into its winding and retracts the other core from its winding, whilst movement of the handle in the opposite direction withdraws the first core from its winding and advances the second core into its winding. It will thus be seen that by varying the positions of the cores within the windings 20 and 21, the voltage of the common point 22 between the two windings is varied over a wide range of values, i. e., between a value approximating the instantaneous voltage of the supply line 11 and a second value approximating the instantaneous voltage of the supply line 12.

The voltage of this common point 22 is, of course, alternating and for the purpose of applying a direct current voltage from the point 22 to the grid $18_c$ of the valve, a suitable rectifying device 23 is included in the connections between the point 22 and the grid $18_c$. As shown, the rectifying device 23 is provided with two anodes, one of which is connected to the common point 22, and with a cathode connected to the grid $18_c$ of the valve 18 and also connected to the lower supply line 12 through a suitable filter device illustrated as comprising a condenser 24 and a resistance 25 connected in parallel relationship with each other. Rectifying device 23 rectifies but one half of the wave of the alternating voltage between the connection 22 and the lower supply line 12. However, this half wave rectified voltage is smoothed by means of the filter device so that a substantially constant direct current voltage is applied to the grid $18_c$.

In order to maintain the voltage across the load circuit 10 at a substantially constant ratio with respect to the voltage of the common point 22, irrespective of variations in the load, i. e., in the number of lamps connected across the load circuit 10, a feed back voltage is supplied from the load circuit to the grid $18_c$ of the valve. This feed back voltage is applied to the grid of the valve by means of a feed back transformer 26, the terminals of the primary winding of which are connected directly across the load circuit 10 and one terminal of the secondary winding of which is connected to an anode of the rectifying device 23 and the other terminal of which secondary winding is connected to the grid $18_c$ and also to the cathode of the rectifying device 23 through a filter device illustrated as comprising a capacitance 27 and a resistance 28. Since the load voltage is alternating, the feed back voltage at the secondary terminals of the transformer 26 is also alternating but one half of the wave of this alternating voltage is rectified by the rectifying device 23 and is smoothed by the filter device so that a smooth direct current voltage is applied to the grid. The connection from the secondary winding of the feed back transformer to the rectifying device 23 and to the grid $18_c$ are so chosen that the polarity of the feed back voltage applied to the grid is opposite to the polarity of the voltage applied from the common connection 22 to the grid and it will thus be seen that the connections serve to compare the load voltage with the voltage of the common connection 22 and thus to equalize these voltages in a well understood manner.

In operation, the switch 30 is moved to the closed position to complete the connections from the load circuit 10 to the upper supply line 11. The movable handle operatively connected with the cores of the coils 20 and 21 is then moved to a position on a calibrated dial corresponding with a desired intensity of illumination of the lamp of the load circuit 10. This movement of the handle advances one core into its associated coil and withdraws the other core from its associated coil by an amount proportional to the movement of the handle. As previously pointed out this operation effects a variation in the voltage at the common connection 22 and likewise results in a variation of the voltage applied from this connection to the grid $18_c$ of the valve 18. As the grid voltage of the valve 18 is varied, the direct current supplied to the magnetization control winding $17_a$ of the variable saturable reactor 17 is also varied. Assuming that the control handle associated with the coils 20 and 21 is moved in a direction such as to increase the intensity of illumination of the lamp of the load circuit, the current supplied to the control winding $17_a$ is increased. This increase in current results in decreasing the reactance of the reactance device 17 and likewise decreasing the voltage drop across the reactive winding thereof, and this in turn results in increasing the voltage across the primary winding of the input transformer 16. Increasing the voltage applied to the transformer 16, of course increases the input to the rectifying devices 14 and 15 and likewise increases the current supplied to the control winding $13_b$ of the reactance device 13. As the current increases in the control winding $13_b$, the reactive voltage drop across the alternating current winding $13_a$ is decreased, thereby resulting in an increase in the voltage across the load circuit 10 and consequently an increase in the intensity of the illumination of the lamps.

Movement of the control handle associated with the coils 20 and 21 in the opposite direction from that assumed above results in decreasing the voltage applied to the load circuit 10 and likewise in decreasing the intensity of the illumination of the lamp. During the above operation, the feed back circuit accurately compares the voltage of the load circuit with that of the common point 22 in a well understood manner so that the voltage at the load circuit is maintained either equal to or at a substantially constant ratio to the voltage of the connection 22 irrespective of the value of the load, i. e., the number of lamps connected across the load circuit 10.

In the modification of Fig. 2, the load circuit 31, the variable saturable core reactance device 32, the rectifying devices 33 and 34 and the control solenoids 35 and 36 are substantially identical with the corresponding elements of the system of Fig. 1 and are connected in a similar manner. The primary winding of the input transformer 37 is connected to the supply line 38—40 in series relationship with the alternating current winding $41_a$ of the variable, saturable core reactance device 41. Direct current is supplied to this control winding by means of a surface contact rectifying device 42 illustrated as a copper oxide rectifying bridge. One bridge point $42_a$ is connected to the lower supply line 40 in series relationship with the alternating current winding of the variable saturable core reactance device 43, whilst the opposite bridge point $42_b$ is connected to the upper supply line 38. The bridge points $42_a$ and $42_b$ thus constitute the input terminals of the bridge, whilst the other pair of terminals $42_c$ and $42_d$ constitute the output terminals and are respectively connected to opposite terminals of the direct current magnetization control winding $41_b$ of the reactance device 41.

As shown, the variable reactance device 43 is provided with a direct current magnetization control winding $43_a$ which is supplied with rectified current from a rectifying device 44, illustrated as a surface contact type rectifying bridge, such for example as a copper oxide rectifying bridge. The input terminal $44_a$ of the bridge is connected to the common connection 45 between the coils 35 and 36 whilst the opposite input terminal $44_b$ is connected to the lower supply line 40. The output terminals $44_c$ and $44_d$ of the bridge are connected to opposite terminals of the direct current magnetization control winding $43_a$ of the variable reactive device 43.

The feed back circuit is illustrated as comprising a variable saturable reactance device 46, having its alternating current winding 46a connected in parallel relationship with the alternating current winding 41a of the reactance device 41 and having its direct current magnetization control winding 46b supplied from the surface contact rectifying bridge 47 which in turn is controlled in accordance with the voltage of the load circuit 31. As shown, the input terminals 47a and 47b of the rectifying bridge 47 are connected across the alternating current winding 32a of the saturable reactance device 32. Since the voltage drop across the reactive winding 32a is the difference between the voltage drop across the load circuit 31 and the voltage drop across the supply lines 38 and 40, it will be clear that the voltage applied to the input terminals of the rectifying bridge 47 is a direct function of the voltage of the load circuit 31.

The variable saturable reactance device 46 thus functions as a variable shunt for the reactive winding 41a of the variable reactance 41 which controls the input to the rectifying devices 33 and 34 and ultimately controls the intensity of illumination of the lamps of the load circuit 31.

In operation, the voltage of the common connection 45 is varied in a manner similar to that already described in connection with Fig. 1. This variation in the voltage of the connection 45 effects a variation in the current supplied to the magnetization control winding 43a of the saturable reactance device 43. Assuming that the movable control handle associated with the coils 35 and 36 is moved in a direction calling for an increase in the intensity of illumination of the lamp of the load circuit, the voltage of the common connection 45 is varied such as to increase the current flowing in the control winding 43a and thereby to decrease the reactive voltage drop across the alternating current winding 43b. A decrease in the voltage drop across the winding 43b effects an increase in the voltage applied to the input terminals of the rectifying bridge 42, and thereby an increase in the current supplied from the output terminals of the bridge to the direct current magnetization control winding 41b. As previously explained, this results in a decrease in the voltage drop across the alternating current winding 41a and likewise an increase in the voltage applied to the primary windings of the input transformer 37. The increased input to the transformer 37 increases the input to the rectifying devices 33 and 34 and likewise increases the direct current supplied to the magnetization control winding of the reactance device 32. As a result of the increased saturation of the device 32, the voltage drop across the reactive winding 32a is decreased which in turn results in an increase in the voltage drop across the load circuit 31 and consequently an increase in the intensity of illumination of the lamps.

Movement of the control handle associated with the coils 35 and 36 in the opposite direction results ultimately in decreasing the intensity of illumination of the lamps of the load circuit in a manner that will be clear from the above description of increasing the intensity of illumination.

The manner in which the feed back circuit functions to maintain the voltage of the load circuit in predetermined relationship to the voltage of the common connections 45 irrespective of variations of the load is as follows:

Assume that a portion of the lamps illustrated in this figure are burned out. This decreases the amount of current flowing in the reactive winding 32a, consequently decreasing the voltage drop across this winding and increasing the voltage drop across the load with the result that the remaining lamps tend to burn at increased brilliancy. However, the decreased voltage drop across the reactive winding 32a decreases the input to the rectifying bridge 47 and likewise decreases the value of the direct current supplied to the direct current magnetization control winding 46b. As the current in the direct current winding 46b decreases, the reactive voltage drop across the alternating current winding 46a increases, thus tending to decrease the voltage applied to the primary winding of the input transformer 37 and likewise decreasing the current supplied to the direct current control winding of the reactance device 32. This decrease in the current flowing in the direct current winding results in increasing the reactive voltage drop across the reactive winding 32a and likewise decreasing the voltage applied to the load circuit 31 and also decreasing the intensity of illumination of the lamps. If the number of lamps is increased instead of decreased, the operation of the feed back circuit is exactly the reverse of the operation just described.

It will thus be seen that the feed back circuit functions to correct for changes in load in such a manner that the load voltage changes by a relatively small amount, when the load changes by a large amount.

Although in accordance with the provisions of the patent statutes the invention is described as embodied in concrete form, it will be understood that the apparatus and connections shown in the drawing are merely illustrative and that the invention is not limited thereto, since alterations and modifications will readily suggest themselves to persons skilled in the art without departing from the true spirit of this invention or the scope of the annexed claims.

What I claim as new and desire to secure by Letters Patent of the United States, is:

1. A control system comprising a load circuit, means for supplying voltage to said load circuit, control means for said load circuit comprising a variable voltage device provided with a control winding, rectifying means for supplying said winding, means for controlling said rectifying means, a variable reactance device provided with a control winding, a source of variable control voltage, and means for substantially maintaining the values of said load voltage and said control voltage in predetermined relationship with each other comprising means controlled by the difference of both said voltages for controlling the current flowing in the control winding of said rectifying control means.

2. A control system for theatre illumination control systems and the like comprising a lamp circuit, means for supplying an alternating voltage to said circuit, means for controlling the intensity of illumination of said circuit comprising a reactance device connected to said circuit and provided with a control winding, rectifying means for supplying direct current to said winding, means for controlling the input to said rectifying means comprising a variable reactance device provided with a control winding, means for supplying an alternating control voltage of variable magnitude, means for deriving an alternating voltage from said load circuit, and means controlled by the difference of said control voltage and said derived voltage for varying the current supplied to the control winding of said input controlling means so as to maintain said derived voltage substantially equal to said control voltage.

3. In an illumination control system and the like, a lamp circuit, means for supplying an alternating voltage to said lamp circuit, voltage control means for said circuit comprising a variable reactance provided with a control winding, rectifying means for supplying current to said control winding, means for varying the current supplied to said control winding, comprising a variable reactance connected in circuit with said rectifying means and provided with a control winding, means for supplying a variable current to said last mentioned control winding comprising an electric valve provided with a control grid, means for supplying a variable control voltage to said grid, and connections from said load circuit to said grid for applying a voltage of opposite polarity to said grid so as to substantially equalize said load circuit voltage and said control voltage.

4. In an illumination control system and the like, a lamp circuit, control means for said circuit comprising a reactance device provided with a control winding, rectifying means for supplying a direct current to said control winding, means for controlling the input to said rectifying means comprising a reactance device provided with a reactance winding and a direct current control winding, means for supplying a variable direct current to said last mentioned control winding, comprising an electric valve provided with a control grid, a source of control voltage of variable magnitude connected to said grid, and connections from said lamp circuit to said grid for applying a voltage of opposite polarity to said grid tending to equalize said lamp circuit voltage and said control voltage.

CHAUNCEY G. SUITS.